United States Patent
Ehrmann et al.

(10) Patent No.: US 10,648,403 B2
(45) Date of Patent: May 12, 2020

(54) TURBOCHARGER FOR A MOTOR VEHICLE

(71) Applicant: Bayerische Motoren Werke Aktiengesellschaft, Munich (DE)

(72) Inventors: Stefan Ehrmann, Fichtenau (DE); Hans-Peter Jelinek, Gerolsbach (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 224 days.

(21) Appl. No.: 15/800,432

(22) Filed: Nov. 1, 2017

(65) Prior Publication Data

US 2018/0066573 A1 Mar. 8, 2018

Related U.S. Application Data

(63) Continuation of application No. PCT/EP2016/063419, filed on Jun. 13, 2016.

(30) Foreign Application Priority Data

Jun. 18, 2015 (DE) .................. 10 2015 211 270

(51) Int. Cl.
*F02B 37/16* (2006.01)
*F02C 6/12* (2006.01)
(Continued)

(52) U.S. Cl.
CPC .............. *F02B 37/16* (2013.01); *F02C 6/12* (2013.01); *F04D 27/0215* (2013.01);
(Continued)

(58) Field of Classification Search
CPC ........ F02B 37/16; F02C 6/12; F04D 27/0215; F04D 29/4213; F04D 29/441; F05D 2220/40; Y02T 10/144
(Continued)

(56) References Cited

U.S. PATENT DOCUMENTS 2,470,565 A * 5/1949 Loss ................... F04D 27/0207
415/27
RE32,462 E * 7/1987 Yoshinaga ............ F04D 29/444
415/208.3
(Continued)

FOREIGN PATENT DOCUMENTS

CH 404 069 A 12/1965
CN 202266789 U 6/2012
(Continued)

OTHER PUBLICATIONS

Machine Translation to Dehnen Ulrich et al. (Pub. No. DE 10 2011 115830 A1), published Apr. 18, 2013.*
(Continued)

*Primary Examiner* — Thai Ba Trieu
(74) *Attorney, Agent, or Firm* — Crowell & Moring LLP

(57) ABSTRACT

In order for charge air to be conducted with the lowest possible losses in pressure in a turbocharger including a blow-off valve, a flow-guiding element in an inlet region is designed such that neutral zones are formed at the flow openings. The flow openings recirculate charge air from the pressure side to the suction side when the blow-off valve is opened. The flow-guiding element avoids vortices and therefore losses in pressure in the region of the flow openings.

18 Claims, 3 Drawing Sheets

(51) Int. Cl.
*F04D 27/02* (2006.01)
*F04D 29/42* (2006.01)
*F04D 29/44* (2006.01)

(52) U.S. Cl.
CPC ..... *F04D 27/0238* (2013.01); *F04D 29/4213* (2013.01); *F04D 29/441* (2013.01); *F05D 2220/40* (2013.01); *Y02T 10/144* (2013.01)

(58) Field of Classification Search
USPC ..... 60/598, 605.1, 611; 415/58.4, 58.3, 206, 415/208.3
See application file for complete search history.

(56) References Cited

U.S. PATENT DOCUMENTS

| | | | | |
|---|---|---|---|---|
| 4,990,053 | A * | 2/1991 | Rohne | F04D 29/4213 415/58.4 |
| 5,246,335 | A * | 9/1993 | Mitsubori | F04D 29/4213 415/58.3 |
| 2003/0115870 | A1 | 6/2003 | Finger et al. | |
| 2009/0013689 | A1* | 1/2009 | Sumser | F04D 29/4213 60/605.1 |
| 2009/0238677 | A1 | 9/2009 | Clemen et al. | |
| 2014/0050576 | A1 | 2/2014 | Li et al. | |
| 2014/0341727 | A1* | 11/2014 | Chen | F04D 29/4213 415/206 |
| 2015/0016968 | A1 | 1/2015 | Grabowska et al. | |
| 2016/0047324 | A1* | 2/2016 | Kemmerling | F04D 29/4213 60/611 |
| 2016/0090901 | A1* | 3/2016 | Svihla | F04D 29/4213 415/58.4 |
| 2016/0131148 | A1* | 5/2016 | Murayama | F04D 29/4213 415/58.4 |
| 2016/0201693 | A1* | 7/2016 | An | F04D 29/4213 415/58.4 |
| 2017/0175681 | A1* | 6/2017 | Sadakane | F02D 41/0087 |
| 2018/0073515 | A1* | 3/2018 | Kanzaka | F04D 29/4213 |
| 2019/0003402 | A1* | 1/2019 | Vierkotten | F02D 9/101 |
| 2019/0264603 | A1* | 8/2019 | Hiller | F01D 17/105 |

FOREIGN PATENT DOCUMENTS

| | | | |
|---|---|---|---|
| CN | 103591050 A | 2/2014 | |
| CN | 104053882 A | 9/2014 | |
| DE | 10 2004 024 948 A1 | 12/2005 | |
| DE | 10 2008 004 834 A1 | 7/2009 | |
| DE | 10 2011 115 830 A1 | 4/2013 | |
| DE | 10 2012 212 738 A1 | 4/2014 | |
| DE | 102013003418 A1 * | 8/2014 | F04D 29/4213 |
| DE | 102014223044 A1 * | 5/2016 | F01D 17/105 |
| EP | 1 275 852 A2 | 1/2003 | |
| EP | 1947299 A2 * | 7/2008 | F01D 17/141 |
| GB | 1043168 | 9/1966 | |
| JP | 11-182257 A | 7/1999 | |
| JP | 2010-174806 A | 8/2010 | |
| JP | 2014101827 A * | 6/2014 | F04D 17/165 |

OTHER PUBLICATIONS

Chinese-language Office Action issued in counterpart Chinese Application No. 201680014469.8 dated May 20, 2019 with English translation (eight (8) pages).
Chinese-language Office Action issued in counterpart Chinese Application No. 201680014469.8 dated Nov. 2, 2018 with English translation (13 pages).
International Search Report (PCT/ISA/210) issued in PCT Application No. PCT/EP2016/063419 dated Aug. 12, 2016 with English translation (seven pages).
German-language Written Opinion (PCT/ISA/237) issued in PCT Application No. PCT/EP2016/063419 dated Aug. 12, 2016 (six pages).
German-language Search Report issued in counterpart German Application No. 10 2015 211 270.5 dated May 10, 2016 with partial English translation (10 pages).
Chinese-language Office Action issued in counterpart Chinese Application No. 201680014469.8 dated Nov. 25, 2019 with English translation (12 pages).

* cited by examiner

TURBOCHARGER FOR A MOTOR VEHICLE

CROSS REFERENCE TO RELATED APPLICATIONS

This application is a continuation of PCT International Application No. PCT/EP2016/063419, filed Jun. 13, 2016, which claims priority under 35 U.S.C. § 119 from German Patent Application No. 10 2015 211 270.5, filed Jun. 18, 2015, the entire disclosures of which are herein expressly incorporated by reference.

BACKGROUND AND SUMMARY OF THE INVENTION

The present invention relates to a turbocharger for a motor vehicle.

A turbocharger of the type emerges for example, from DE 10 2012 212 738 A1.

A turbocharger of the type has a compressor to which there is connected, at the suction side, a feed duct in the form of a suction pipe for charge air to be compressed and, at the pressure side, a pressure duct in the form of a pressure pipe for the compressed air. Furthermore, in the case of such turbochargers, there is normally additionally provided a bypass duct which connects the suction side to the pressure side. In the bypass duct, there is integrated a so-called overrun air recirculation valve for the controlled opening and closure of the bypass duct. The overrun air recirculation valve serves for pressure equalization and for preventing so-called pressure pulsation fluctuations. This is necessary, in particular, in the event of rapid load alterations, in particular load dumping, for example as a result of closure of the throttle flap, because, owing to the inertia of the compressor, a very high mass flow continues to be compressed for a short period of time, but is no longer taken in by the engine. This would result in the highly compressed charge air being repelled counter to the actual delivery direction.

Here, the charge air that is recirculated by the bypass duct may lead to undesired flow noises.

In DE 10 2012 212 738 A1, a diffuser as a separate component is provided in the inlet region, that is to say in the region in which the feed duct is connected to the compressor, which diffuser has, at the circumference, a multiplicity of flow openings by means of which a connection in terms of flow to the bypass duct can be realized.

The diffuser of the type can, however, result, during normal operation of the turbocharger, in pressure losses in the inflow of the charge air to be compressed.

Thus, it is the object of the invention to improve a turbocharger of the type for a motor vehicle with regard to the greatest possible pressure losses.

This and other objects are achieved in accordance with embodiments of the invention. A turbocharger includes a compressor and a suction-side feed duct, in the form of a suction pipe, for the charge air to be compressed. The charge air flows, during operation, in a flow direction to the compressor. Here, the feed duct is connected, in an inlet region, to the compressor. Furthermore, the turbocharger includes a pressure-side pressure duct, which is in particular in the form of a pressure pipe, for the compressed charge air. Furthermore, a bypass duct is formed which connects the feed duct to the pressure duct. For this purpose, at least one flow opening is formed on the circumference in the inlet region. Furthermore, the turbocharger includes an, in particular, electrically actuated overrun air recirculation valve for the controlled opening and closure of the bypass duct. It is also of particular importance that a flow-guiding element is situated in the feed duct upstream of the at least one flow opening in the flow direction, which flow-guiding element is formed and/or arranged such that an area of reduced pressure—in relation to the normal pressure of the charge air in a central region of the feed duct in the inlet region—forms at the flow opening during operation.

By way of this measure, it is therefore achieved that a relatively low pressure, in particular a flow dead zone, is formed directly at at least one flow opening, such that the charge air thus does not flow directly past the flow openings. Specifically, tests have shown that, in the case of the normal throughflow of the charge air at the flow openings, turbulence arises which then leads to undesired pressure losses. Such turbulence would also lead to undesired flow noises. By way of the measure described here, it is thus firstly the case that the pressure loss is kept low, and secondly, flow noise is also prevented or at least reduced.

It is preferable for multiple flow openings to be formed so as to be distributed over the circumference, such that altogether an adequately large flow cross section is formed and the charge air can flow uniformly back into the inlet region when the overrun air recirculation valve is open.

Here, the flow openings are preferably arranged only on a single, common circumferential line. They are therefore not spaced apart from one another or distributed in a flow direction. This makes it possible in a simple manner in terms of construction to form the desired flow dead zone for all flow openings.

In a preferred embodiment, the flow-guiding element has in this case a separation edge for the charge air to be compressed. Therefore, in particular, an abrupt cross-sectional widening for the charge air to be compressed is formed in the region of the flow-guiding element, such that, as viewed in the flow direction, the dead zone forms directly downstream of the separation edge. The at least one flow opening is correspondingly also arranged in the region immediately downstream of the separation edge.

The separation edge is preferably of encircling form, that is to say the flow-guiding element is preferably in the form of an encircling ring-shaped element.

In a preferred refinement, the flow-guiding element is in this case formed as a flow obstruction which narrows a flow cross section of the inlet region. In this embodiment, therefore, it is, in particular, the case that an encircling ring-shaped element is inserted in a simple manner into the inlet region directly upstream of the flow openings. Although this reduces the overall flow cross section, the positive effect of the elimination of turbulence at the flow openings is however predominant.

As an alternative to the arrangement of the flow-guiding element in the form of a flow obstruction, it is, however, also possible for the flow cross section to be widened, for example by virtue of a radial widening with an enlarged flow cross section in relation to the feed duct being formed in the inlet region.

For a more comprehensive reduction of possible pressure losses, it is the case in a preferred refinement that the flow-guiding element, which is in particular in the form of a flow obstruction, is not of continuous form as viewed in the circumferential direction. Therefore, instead of a continuous ring, multiple flow-guiding elements are formed so as to be distributed over the circumference, which flow-guiding elements are in each case spaced apart from one another in the circumferential direction. The flow radius of the feed duct is therefore maintained in the region of the spacings. Here, the flow-guiding elements arranged so as to be distributed in the circumferential direction are in each case positioned immediately upstream of at least one suction opening or else of a group of flow openings such that, in turn, the desired dead zone is formed at each flow opening.

Here, in a preferred embodiment, a separate flow-guiding element is assigned, in the manner of a flow obstruction, to each flow opening. Here, the flow-guiding element preferably projects radially inward and is formed in particular in the manner of a nose or generally in approximately a wedge shape. The flow-guiding element has a separation edge on the end side. In each case one flow opening is then arranged downstream of the nose.

Furthermore, the separation edge is preferably of curved form and has, in particular, an identical or at least substantially identical curvature to the flow opening. In this way, an arrangement of the flow opening directly downstream of the nose is promoted. A curved face surface, which is at the rear side as viewed in the flow direction, of the nose merges in a preferably flush manner in the radial direction into the flow opening.

The flow openings arranged so as to be distributed around the circumference are preferably connected to an encircling ring-shaped duct which is then adjoined by a suction-side subsection of the bypass duct. Thus, during operation, for example when the throttle flap is closed, charge air flows from the pressure side via the ring-shaped duct through the flow openings to the suction side (low-pressure side). The bypass duct may generally be divided into a suction-side subsection and a pressure-side subsection. The pressure-side subsection is formed between the overrun air recirculation valve and the pressure side, and the suction-side subsection is formed between the overrun air recirculation valve and the suction side.

In a preferred embodiment, it is furthermore the case that no flow opening is formed in the region in which the suction-side subsection opens into the ring-shaped duct. This promotes an efficient and uniform distribution of the recirculated charge air.

In general, the feed duct has, on an end side, an inlet connector by way of which it is fastened to the compressor. The inlet connector forms in this case the inlet region with the at least one flow opening and the flow-guiding element.

Other objects, advantages and novel features of the present invention will become apparent from the following detailed description of one or more preferred embodiments when considered in conjunction with the accompanying drawings.

DETAILED DESCRIPTION OF THE DRAWINGS

In the figures, parts of identical action are denoted by the same reference designations.

Figure 1:
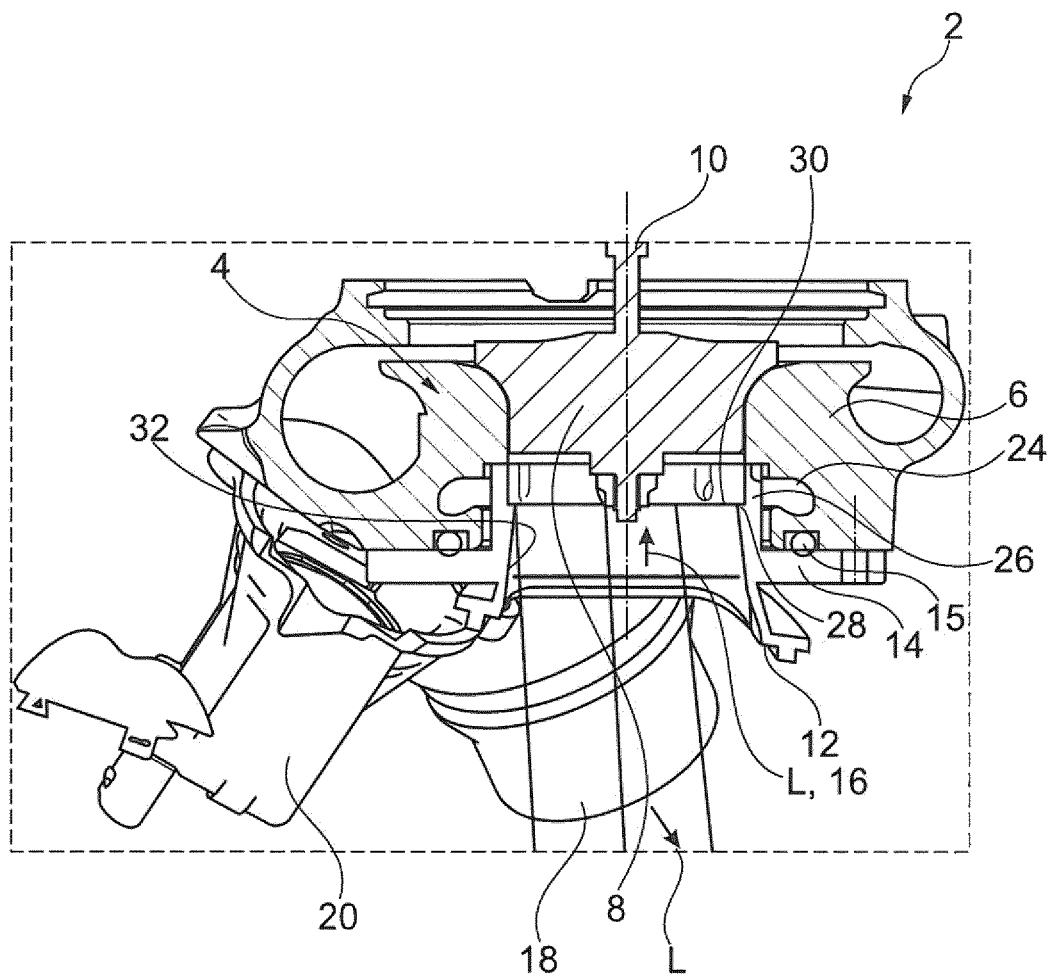
FIG. 1 is a detail sectional illustration through a turbocharger.

The turbocharger 2 illustrated in FIG. 1 comprises a compressor 4 which has a compressor element which is arranged in a compressor housing 6 and which is in particular in the form of a compressor wheel 8. During operation, the compressor wheel 8 rotates about an axis of rotation 10. Charge air L to be compressed is fed to the compressor wheel 8 at the suction side via a suction duct. The suction duct is in this case normally formed by a suction pipe 12 which has, on an end side, an inlet connector 14 by way of which it is fastened to the compressor housing 6, for example, with the aid of bolts. Here, the inlet connector 14 defines an inlet region. The inlet connector 14 is sealed off with respect to the compressor housing 6 by way of a sealing element 15 (ring-shaped seal). The inlet connector 14 bears by way of an encircling collar against the compressor housing 6 and is plugged into the compressor housing 6.

During operation, the charge air L flows through the inlet connector 14 in a flow direction 16.

During normal operation, the compressed charge air L emerges at a pressure side via a pressure duct 18. In FIG. 1, for this purpose, a pressure connector is shown to which there can furthermore be connected a pressure pipe which leads to the internal combustion engine.

Figure 2:
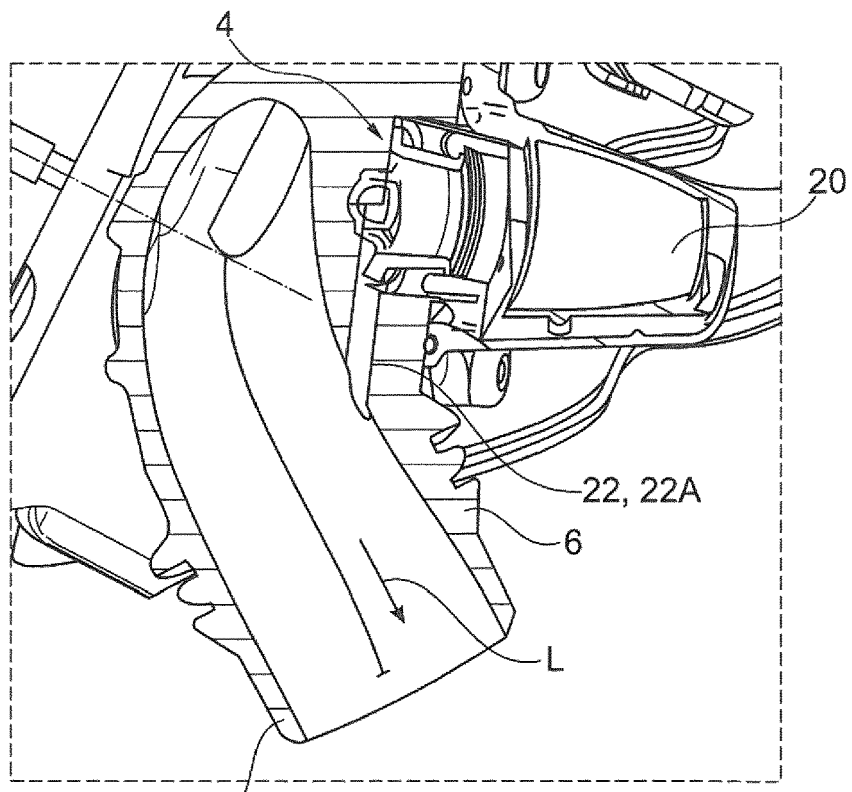
FIG. 2 is a detail sectional view illustrating the pressure side of the turbocharger.
Figure 3:
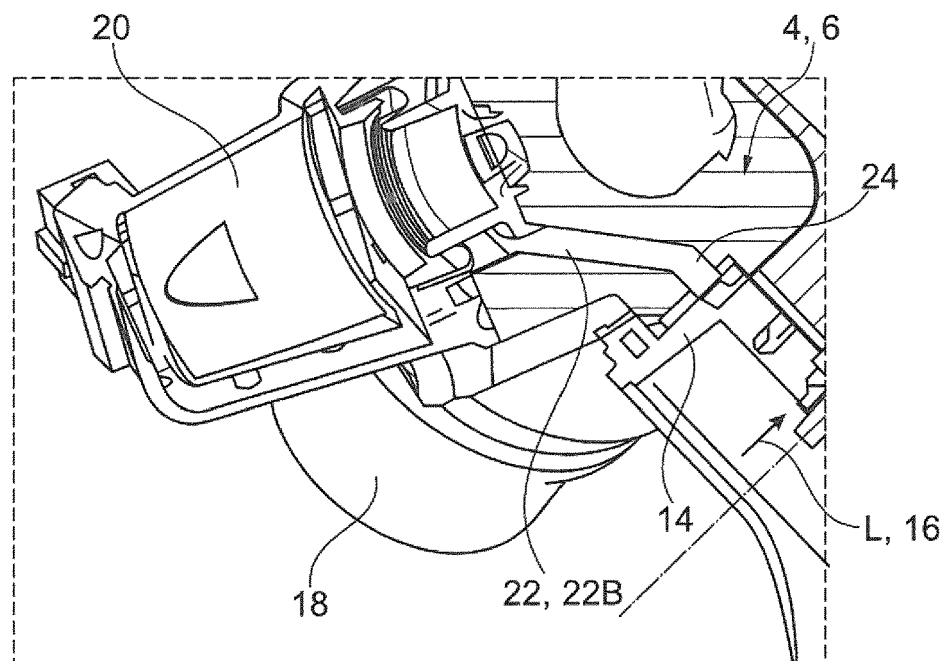
FIG. 3 is a detail sectional view illustrating the suction side of the turbocharger.

Furthermore, the turbocharger 2 has an overrun air recirculation valve 20 which is in the form of a switching valve for opening up and closing off a bypass duct 22 (see FIGS. 2 and 3). Here, the bypass duct 22 connects the pressure side of the turbocharger 2 to the suction side thereof, in particular to an inlet region formed by the inlet connector 14. Here, the overrun air recirculation valve 20 divides the bypass duct 22 into a pressure-side subsection 22A (see FIG. 2) and a suction-side subsection 22B (see FIG. 3).

For the recirculation of the charge air L when the overrun air recirculation valve 20 is open, a ring-shaped duct 24 is formed in the compressor housing 6 so as to encircle the inlet connector 14. Here, the suction-side subsection 22A opens into the ring-shaped duct 24 (see FIG. 3).

Figure 4:
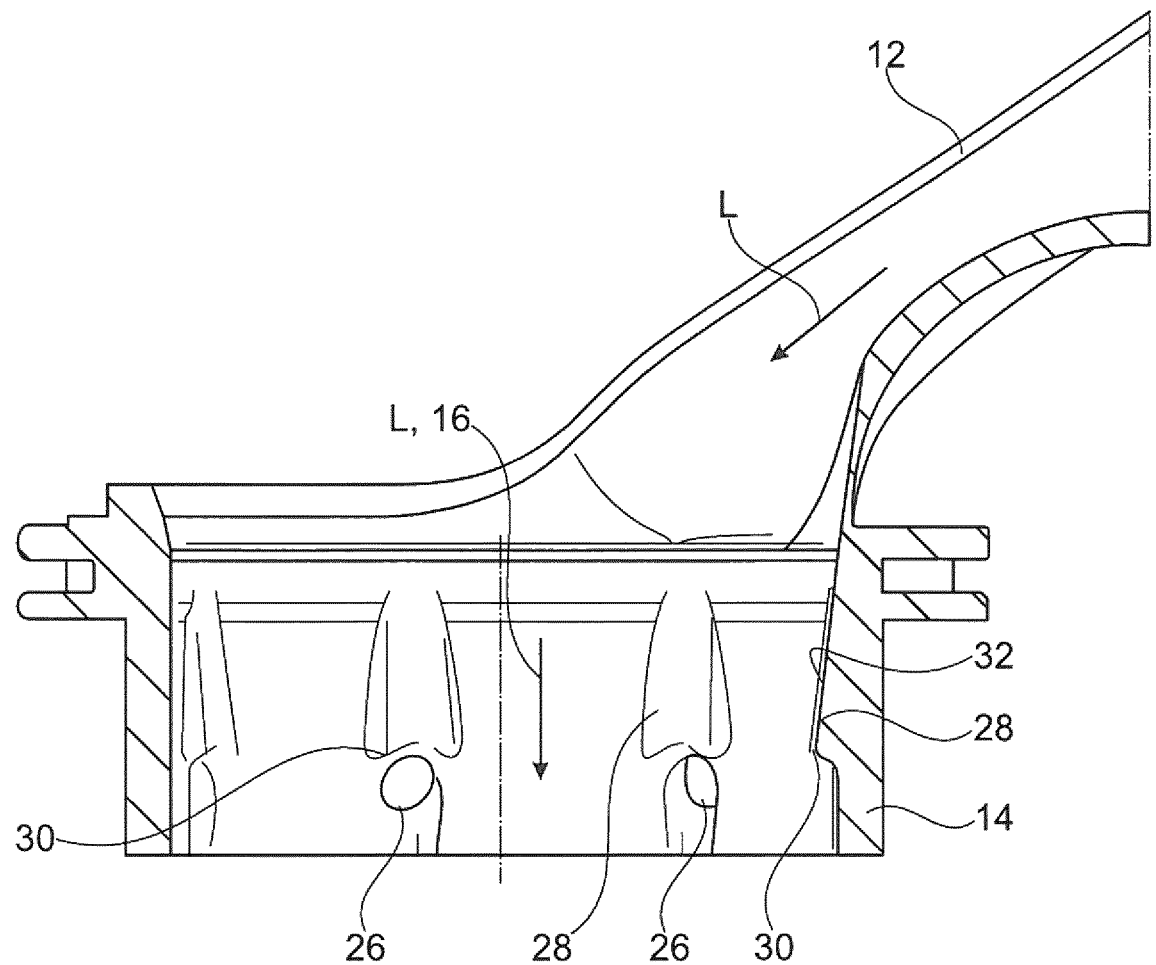
FIG. 4 is a detail illustration of a suction duct with inlet connectors in a second variant.

In the region of the ring-shaped duct 24, that is to say at the same axial height in relation to the flow direction 16, the inlet connector 14 has multiple flow openings 26 distributed over its circumference (see FIGS. 1 and 4).

It is now of particular importance that, in the inlet connector 14, there is formed at least one flow-guiding element 28 which, as viewed in the flow direction 16, has a separation edge 30 on the end side.

FIGS. 1 to 3 illustrate a first design variant with an inlet connector 14 with a ring-shaped flow-guiding element 28. By contrast, FIG. 4 shows a second design variant, in the case of which, instead of the single flow-guiding element 28, multiple flow-guiding elements 28 are arranged so as to be distributed over the circumference, which flow-guiding elements are in each case spaced apart from one another.

Both design variants have in common that a respective flow opening 26 is arranged directly downstream of the separation edge 30, wherein here, the flow opening 26 is formed in a wall region of the inlet connector 14 which is offset outward in a radial direction with respect to the separation edge 30. In this way, a so-called dead zone is formed directly downstream of the separation edge 30 and thus directly downstream of the flow-guiding element 28 during operation, in which dead zone no flow pressure or at least a pressure lower than that at the center of the inlet connector 14 prevails. In this way, turbulence in the region of the flow openings 26, and thus pressure losses, are avoided.

For this purpose, the flow-guiding elements 28 are in the form of flow obstructions, which narrow the free flow cross section for the charge air. Here, the flow-guiding elements 28 have in each case a guide surface 32 which is inclined obliquely with respect to the flow direction 16, such that a homogeneous and uniform cross-sectional reduction is realized, and turbulence is avoided.

In the design variant as per FIG. 1, the flow-guiding element 28 is therefore in the form of a ring-shaped element, wherein, downstream of the ring-shaped element, the flow cross section abruptly widens again at the separation edge 30. The flow openings 26 are formed directly downstream of or at the abrupt step-like widening.

In the alternative refinement as per FIG. 4, each flow opening 26 is assigned to a separate flow-guiding element 28, in particular, in the form of an approximately wedge-shaped nose. Here, each individual nose has an oblique guide surface 32 with an end-side separation edge 30. Here, in the exemplary embodiment, the face side, formed at the separation edge 30, of the nose preferably has a rounded surface, wherein the rounding preferably has the same radius as the flow opening 26 immediately adjacent thereto. The individual flow-guiding elements 28 are thus spaced apart from one another. In the circumferential direction, the individual flow-guiding elements 28 have an extent dimensioned such that they cover only a respective downstream flow opening 26. Altogether, the entirety of the flow-guiding elements 28 in the design variant of FIG. 4 covers only a small part of the circumference of the inlet connector 14, in particular less than 50% of the circumference.

LIST OF REFERENCE DESIGNATIONS

2 Turbocharger
4 Compressor
6 Compressor housing
8 Compressor wheel
10 Axis of rotation
12 Intake pipe
14 Inlet connector
15 Sealing element
16 Flow direction
18 Pressure duct
20 Overrun air recirculation valve
22 Bypass duct
22A Suction-side subsection
22B Pressure-side subsection
24 Ring-shaped duct
26 Flow opening
28 Flow-guiding element
30 Separation edge
32 Guide surface
L Charge air The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A turbocharger for a motor vehicle, comprising:
a compressor;
a suction duct for charge air to be compressed, the charge air during operation flowing in a flow direction to the compressor, wherein an inlet region of the suction duct is connected to the compressor;
a pressure duct configured to receive the charge air compressed by the compressor;
a bypass duct configured to connect the suction duct to the pressure duct via at least one flow opening provided on a circumference in the inlet region;
an overrun air recirculation valve for controlled opening and closure of the bypass duct; and
a flow-guiding element upstream in the flow direction of the at least one flow opening, the flow-guiding element being configured such that an area of reduced pressure relative to a pressure at the flow-guiding element forms at the flow opening.

2. The turbocharger according to claim 1, wherein the at least one flow opening includes multiple flow openings distributed over the circumference of the inlet region.

3. The turbocharger according to claim 2, wherein the multiple flow openings are arranged on a line in a circumferential direction.

4. The turbocharger according to claim 1, wherein the flow-guiding element forms a separation edge for the charge air to be compressed.

5. The turbocharger according to claim 4, wherein the separation edge is of encircling form.

6. The turbocharger according to claim 4, wherein the flow-guiding element is formed as a flow obstruction which narrows a flow cross section of the inlet region.

7. The turbocharger according to claim 6, wherein the flow-guiding element is in the form of an encircling ring.

8. The turbocharger according to claim 1, wherein the flow-guiding element is formed as a flow obstruction which narrows a flow cross section of the inlet region.

9. The turbocharger according to claim 1, wherein the flow-guiding element is in the form of an encircling ring.

10. The turbocharger according to claim 1, wherein multiple mutually spaced-apart flow-guiding elements are arranged in the circumferential direction.

11. The turbocharger according to claim 10, wherein each of the at least one flow opening is assigned to a respective one of the at least one flow-guiding element.

12. The turbocharger according to claim 11, wherein the separate flow-guiding element is nose-shaped.

13. The turbocharger according to claim 11, wherein the each of the at least one flow opening opens into an encircling ring-shaped duct which is adjoined by a suction-side subsection of the bypass duct.

14. The turbocharger according to claim 13, wherein no flow opening is formed in a region in which the suction-side subsection opens into the ring-shaped duct.

15. The turbocharger according to claim 1, wherein the at least one flow opening opens into an encircling ring-shaped duct which is adjoined by a suction-side subsection of the bypass duct.

16. The turbocharger according to claim 15, wherein no flow opening is formed in a region in which the suction-side subsection opens into the ring-shaped duct.

17. The turbocharger according to claim 15, wherein the suction duct has, on an end side, an inlet connector which forms the inlet region with the at least one flow opening.

18. The turbocharger according to claim 1, wherein the suction duct has, on an end side, an inlet connector which forms the inlet region with the at least one flow opening.

\* \* \* \* \*